(12) United States Patent
Alkabie et al.

(10) Patent No.: US 7,950,233 B2
(45) Date of Patent: May 31, 2011

(54) COMBUSTOR

(75) Inventors: Hisham Alkabie, Oakville (CA); Kian McCaldon, Orangeville (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 700 days.

(21) Appl. No.: 11/393,756

(22) Filed: Mar. 31, 2006

(65) Prior Publication Data

US 2007/0227150 A1    Oct. 4, 2007

(51) Int. Cl.
 *F02C 1/00* (2006.01)
(52) U.S. Cl. ........................................... 60/752; 60/804
(58) Field of Classification Search .................... 60/737, 60/738, 752, 760, 804
 See application file for complete search history.

(56) References Cited

U.S. PATENT DOCUMENTS

| | | | |
|---|---|---|---|
| 2,504,106 A | 4/1950 | Berger | |
| 3,557,553 A | 1/1971 | Schmitz | |
| 3,623,711 A | 11/1971 | Thorstenson | |
| 3,899,884 A | 8/1975 | Ekstedt | |
| 3,952,501 A | 4/1976 | Saintsbury | |
| 3,954,389 A | 5/1976 | Szetela | |
| 4,446,692 A | 5/1984 | Adkins | |
| 4,928,481 A | 5/1990 | Joshi et al. | |
| 5,123,248 A | 6/1992 | Monty et al. | |
| 5,187,937 A | 2/1993 | Stevens et al. | |
| 5,572,862 A | 11/1996 | Mowill | |
| 5,669,218 A * | 9/1997 | Greninger | 60/39.49 |
| 5,687,572 A | 11/1997 | Schrantz et al. | |
| 5,749,219 A | 5/1998 | DuBell | |
| 6,253,538 B1 | 7/2001 | Sampath et al. | |
| 6,286,300 B1 * | 9/2001 | Zelina et al. | 60/804 |
| 6,339,923 B1 * | 1/2002 | Halila et al. | 60/798 |
| 6,826,913 B2 | 12/2004 | Wright | |
| 6,845,621 B2 * | 1/2005 | Teets | 60/804 |
| 2005/0229604 A1 * | 10/2005 | Chen | 60/776 |

* cited by examiner

*Primary Examiner* — Michael Cuff
*Assistant Examiner* — Phutthiwat Wongwian
(74) *Attorney, Agent, or Firm* — Ogilvy Renault LLP

(57) ABSTRACT

A combustor is provided having one or more apertures adapted to asymmetrically introduce air adjacent the fuel nozzles to reduce smoke resulting from unburned hydrocarbons in a gas turbine engine combustion system by impeding escape of unburned hydrocarbons.

15 Claims, 5 Drawing Sheets

COMBUSTOR

TECHNICAL FIELD

The invention relates generally to gas turbine engines, and, more particularly, to an improved combustor for gas turbine engines.

BACKGROUND OF THE ART

Commercial aircraft gas turbine engines must meet certain federally-mandated smoke and emissions requirements. The prior art includes various means for reducing gas turbine engine exhaust emissions and smoke, for example through more fully mixing and atomizing fuel and air in order to obtain more complete combustion. Nevertheless, prior art means do not always result in low smoke and emissions in combustor exhaust gases. Under the pressure differential existing in a combustor chamber, some unburned fine fuel droplets escape to the combustor, thereby creating visible or invisible smoke and emissions in combustor exhaust gases. Accordingly, there is a need to provide improved low smoke and emissions combustor to avoid the shortcomings of the prior art.

SUMMARY OF THE INVENTION

It is therefore an object of this invention to provide an improved combustor for gas turbine engines.

In one aspect, the present invention provides a combustor for a gas turbine engine, the combustor comprising a combustor liner defining a combustor chamber, a plurality of nozzle holes permitting fuel nozzles to communicate with the combustor chamber therethrough, and at least one smoke aperture defined in the combustor liner asymmetrically adjacent to each nozzle hole, the smoke aperture and nozzle holes having substantially parallel axes, the smoke aperture sized and positioned to in use admit a pressurized air flow therethrough to substantially tangentially impinge a fuel/air swirl cone supplied through the nozzle hole.

In another aspect, the present invention provides a combustor for a gas turbine engine comprising a liner having annular outer and inner walls defining an annular chamber therebetween, a plurality of circumferentially spaced fuel nozzle holes defined in the liner for introducing a fuel/air mixture into the chamber for combustion, and means asymmetrically associated with the fuel nozzle holes for creating a local air barrier within the chamber adjacent to each of the fuel nozzle holes to block escape of unburned fuel to an exit of the chamber.

In a further aspect, the present invention provides a combustor for a gas turbine engine comprising a liner having annular outer and inner walls defining an annular chamber therebetween, a plurality of circumferentially spaced fuel nozzle holes defined in the outer wall each to permit a fuel nozzle to extend radially therethrough for introducing a swirl cone of fuel/air mixture into the chamber for combustion, and at least one smoke aperture defined in the outer wall asymmetrically relative to each nozzle hole, the smoke aperture and nozzle holes having substantially parallel axes, the smoke aperture positioned relative to the nozzle hole to admit air therethrough to substantially tangentially impinge the swirl cone.

Further details of these and other aspects of the present invention will be apparent from the detailed description and drawings included below.

DESCRIPTION OF THE DRAWINGS

Reference is now made to the accompanying drawings depicting aspects of the present invention, in which.

DETAILED DESCRIPTION OF THE PREFERRED EMBODIMENTS

Figure 1:
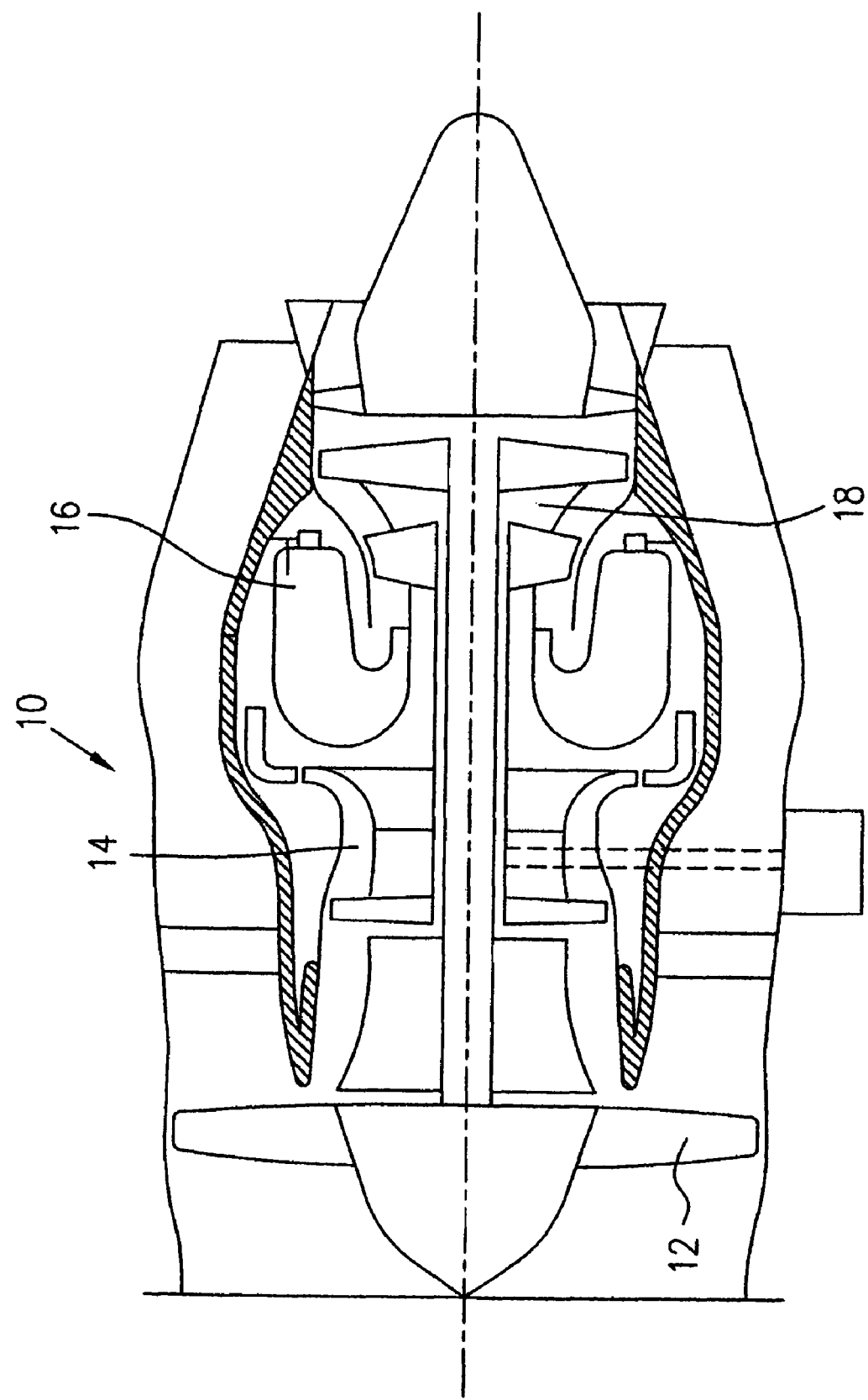
FIG. 1 is a schematic cross-sectional view of a turbofan gas turbine engine which illustrates an exemplary application of the present invention.

A turbo fan engine 10 illustrated schematically in FIG. 1, presented as an example of the application of the present invention, includes a spool assembly which includes a fan 12, a compressor section 14, and a turbine assembly 18. A casing surrounds the spool assembly to define a main fluid path (not indicated) therethrough. In the main fluid path there is provided a combustor 16 with fuel injecting means (not indicated) to constitute a gas generator section. In this figure, a reverse flow annular combustor is shown in a turbofan, although it will be recognized that a variety of combustor configurations are available for use in with the present invention, and may be provided in turbofans, turboprops, turboshafts or auxiliary power unit gas turbines. The fan 12 and compressor 14 drive a main airflow (not indicated) along the main fluid path to take part and support a combustion reaction within the combustor 16. Combustion gases are discharged from the combustor 16 to power the turbine 18 and then are discharged out of the casing.

It should be noted that similar components of the different embodiments shown in the accompanying Figures are indicated by similar numerals for convenience of description of the present invention. Only those components different in one embodiment from the other will be separately described with reference to additional numerals.

Figure 2:
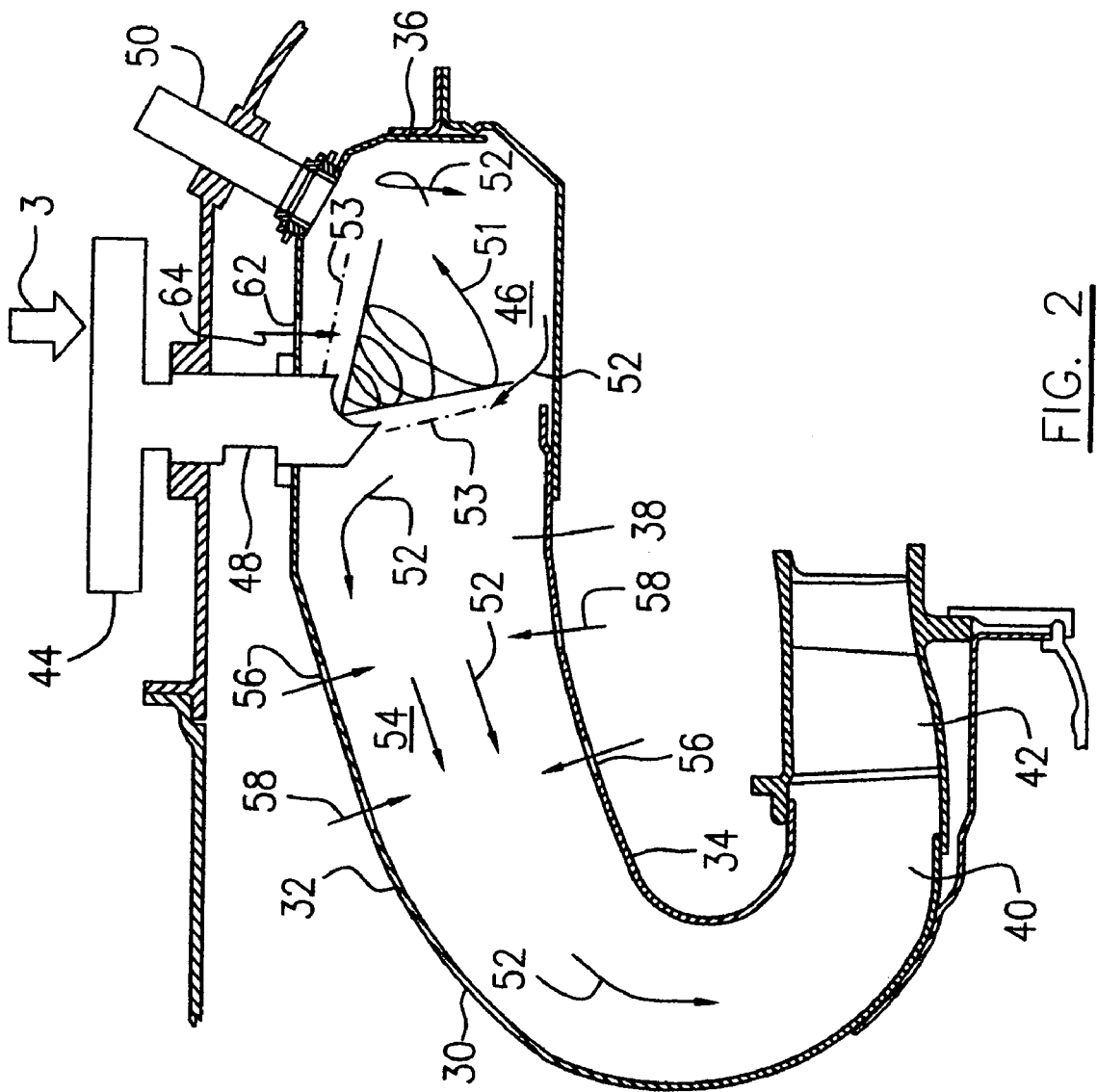
FIG. 2 is a schematic sectional view of a low smoke and emissions combustor of a gas turbine engine according to one embodiment of the present invention.
Figure 3:
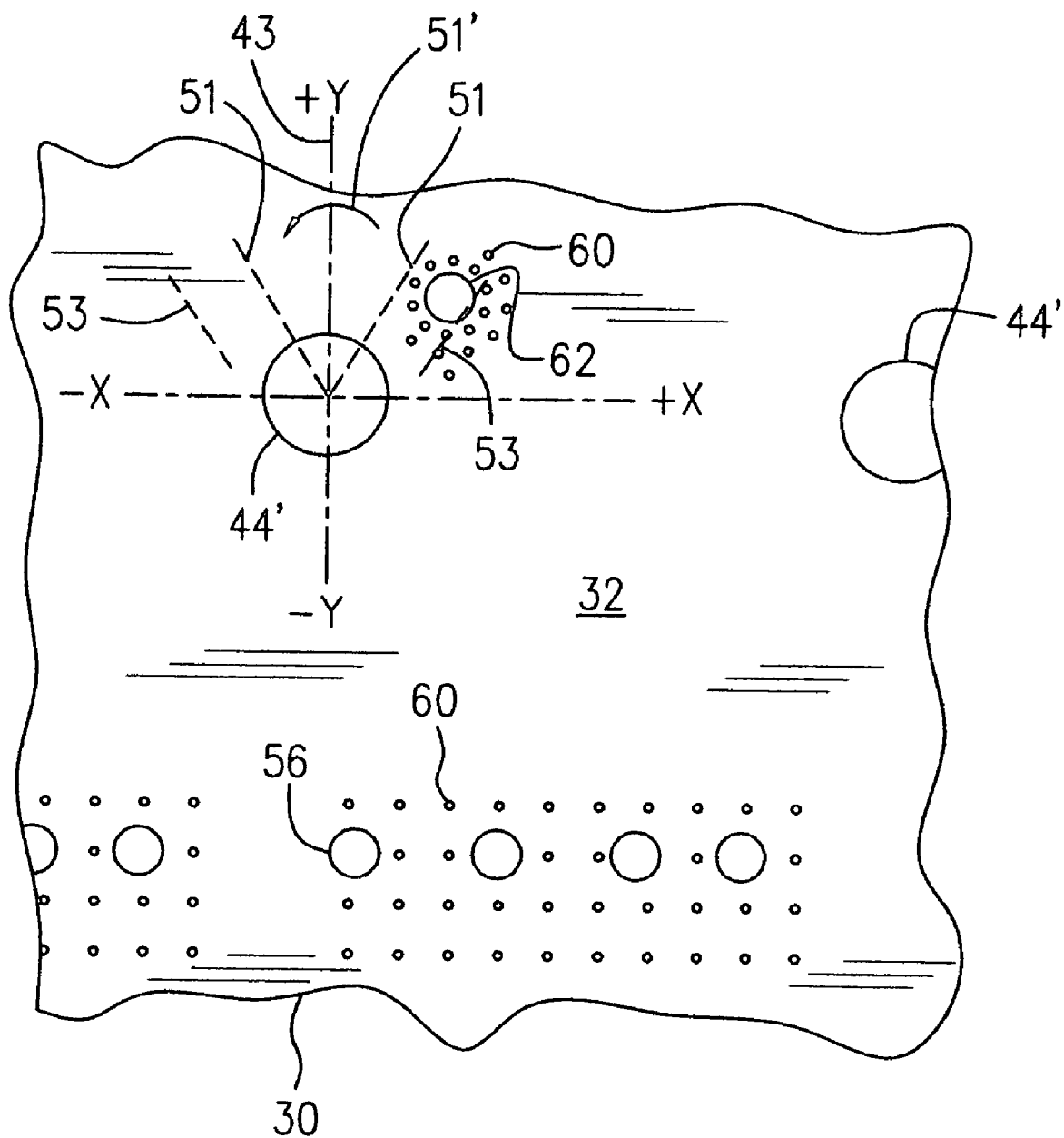
FIG. 3 is a partial top view of the combustor indicated by arrow 3 in FIG. 2, showing a single smoke aperture in an outer wall of the combustor liner.

Referring to FIGS. 2-3, the combustor 16, provided in a reverse-flow configuration, includes, for example, an reverse-flow annular combustor liner 30 having outer and inner walls 32, 34 and a head section defined by end wall 36 to thereby define an annular combustor chamber 38 in a reversed pattern, as specifically illustrated in FIG. 2. The combustor chamber 38 has an exit 40 to discharge combustion exhaust gases out through a combustor nozzle 42 to drive the turbines 18.

A plurality of circumferentially spaced fuel nozzle assemblies 44 are in this example radially mounted to the outer wall 32 of the combustor liner 30 such that an end section of each fuel nozzle assembly 44 extends radially into a primary combustion zone 46 of the combustor chamber 38. Each fuel nozzle assembly 44 is connected with a fuel source (not shown) and has at least one primary air inlet 48 in fluid communication with compressed air surrounding the combustor 16. Thus, the fuel and the primary air are mixed by the fuel nozzle assembly 44 and the fuel/air mixture is introduced into the primary combustion zone 46 of the combustor chamber 38. The primary air is preferably directed as air jets in a swirling form for atomizing the fuel. The end exit of each fuel nozzle assembly 44 is preferably in this combustor configuration in a direction at an angle (i.e. greater than zero) relative to the axial direction of the fuel nozzle assembly 44 (i.e. the axial direction of the fuel nozzle assembly 44 is generally vertical in FIG. 2) such that the fuel/air mixture is introduced to the primary combustion zone 46 of the combustor chamber 38 in a main direction at a downward angle (as seen in FIG. 2) generally towards the radially inner side of the end wall 36 of the combustor liner 30, as will be described further below.

One or more ignitors 50 are mounted to (or through) the combustor liner 30, for example close to the end wall 36, for ignition of the introduced fuel/air mixture to start a combustion reaction within the combustor chamber 38. The fuel/air mixture is injected into the combustor liner 30 in a swirl pattern or cone 51 swirling in a direction indicated by arrows 51', where it is ignited to provide a swirling flame front (generally corresponding to cone 51). The combustion reaction substantially occurs in the primary combustion zone 46 of the combustor chamber 38, thereby creating a primary combustion area therein. Arrows 52 within the combustor chamber 38 show the generated combustion gases flowing towards the combustor exit 40 and the combustor nozzle 42. There are secondary combustion and/or dilution zone(s) 54 defined within the combustor chamber 38 downstream of the primary combustion zone 46, as will be understood by the skilled reader. (As used herein, the terms: "primary combustion zone" is the region in which the chemical reaction of combustion is completed, and has the highest flame temperature within the combustor; "secondary zone" is the region characterized by first additional air jets to quench the hot product generated by the primary zone; and "dilution zone" is the region where second additional jets quench the hot product and profile the hot product prior to discharge to turbine section.) A plurality of secondary and/or dilution air inlets 56 are defined in the combustor liner 30 for introducing secondary and/or dilution air jets, as shown by arrows 58, into the secondary combustion and/or dilution zones 54 to participate in further combustion reactions.

Preferably, the combustor liner 30 further includes a plurality of effusion holes 60 to allow compressed air around the combustor liner 30 to effuse into the combustor chamber 38 for cooling the walls of the combustor liner 30. Effusion holes 60 are generally distributed around the combustor liner 30, as desired by the designer, to provide cooling of the liner 30. Only a sample portion of cooling holes 66 are shown in FIG. 3, for reasons of clarity.

Although the fuel/air mixture introduced by the fuel nozzle assemblies 44 into the combustor chamber 38 is adjusted to a preferred ratio, visible smoke with carbon particulate concentration at a relatively high level may, in theory, still occur in the combustion exhaust gases if unburned fuel droplets (i.e. unburned hydrocarbons, or UHC) contained in the fuel/air mixture are permitted to escape combustion and be carried by the flow to the combustor exit. Typically this occurs mostly in air travelling along the radially outer wall of the primary combustion zone of combustor liner (i.e. between the fuel nozzles in FIGS. 2 & 3), and hence such particles tends to escape combustion or complete combustion. The present invention, therefore, includes a means for impeding such escape, as will now be described.

In accordance with one embodiment of the present invention shown in FIGS. 2 and 3, a so-called "smoke aperture" 62 is defined in the combustor liner 30 and located in the primary combustion zone 46 adjacent to each of the fuel nozzle assemblies 44, as will be described further below. In use, pressurized air around the combustor 16 results in an airflow 64 introduced to the combustor through smoke apertures 62, as will be described further below.

Referring now to FIG. 3, the outer wall 32 of the combustor liner 30 is shown and the apertures 44' represent the location of the fuel nozzle 44. The upper portion of FIG. 3 corresponds to the primary combustion zone, the lower portion of the Figure corresponds to the secondary combustion and/or dilution zones, and the left and rights sides correspond to the circumferential direction of the combustor. A comparison of FIGS. 2 and 3 will reveal that FIG. 2 is somewhat schematic for description purposes, and is not a true planar section through combustor liner 30, as smoke aperture 62 is not located in the same axial plane 43 (see FIG. 3) of the fuel nozzle assembly 44 as would otherwise seem to be the case from an examination of FIG. 2 alone. For description purposes, the fuel nozzle hole 44' has imaginary horizontal x-x and vertical y-y axes (defined in accordance with the usual convention, as will be appreciated by the skilled reader), and the arrow 51' indicates the general direction of swirl around the nozzle inside the combustor, in this case anti-clockwise relative the axes. The lines 51 represent the notional boundary of the swirl cone 51, i.e. the location of the flame front, and the lines 53 represent the outer boundary of the aerodynamic barrier created by the airflow 64 through aperture 62.

The general placement of smoke aperture 62 is a matter of design particular to the combustor in question, however it's placement relative to hole 44' is determined generally based on four basic factors, namely: (a) the location and cone angle of the swirl cone 51 (i.e. the placement of the flame front); (b) the direction of combustion gas and flame front swirl inside the combustor; (c) the desired residence time for the airflow 64 in the primary combustion zone; and (d) the desired position to impede the unburned hydrocarbon (UHC) "escape" path, discussed briefly above (the last parameter being more or less a function of previous parameters). The smoke aperture 62 is preferably located such that the introduced airflow 64 is tangentially to, and in the same direction of, the swirl direction of the fuel/air mixture of the swirl cone 51 (as indicated by the arrows 51')—hence, as noted in (a) and (b) above, the smoke aperture 62 will be place to introduce airflow 64 tangentially and in the same direction as cone 51. Also, to increase residence time as noted in (c), it is desired to place aperture 62 in quadrant "+x+y" in the case of FIG. 3, where an anti-clockwise swirl is present, and preferably closer to the x-axis than the y-axis in that quadrant, to further improve residence time, although this may vary by combustor configuration. For example, in the combustor of FIGS. 2-4, where nozzles 44 enter the combustor through the outer radial wall, to improve mixing it is also desirable to place smoke aperture(s) 62, 66 in the middle of the primary combustion zone, resulting in a placement which is about the 45° position in the +x+y quadrant. In contrast, in the combustor of FIG. 5-6 (discussed below), where nozzles 44 enter the combustor axially through the end wall, a smoke aperture position closer to the x-axis will still permit place centrally within the primary combustion zone. Finally, generally by following the above guidance, aperture 62 positions airflow 64 to act as an aerodynamic blockage to impede UHC escape along the outer wall 32 between adjacent fuel nozzles 34, by pushing the combustor flow away from the wall and back towards the flame front. As mentioned, the optimum placement within these general guidelines will depend on combustor and nozzle configuration, and may also require some experimentation by the designer to fully optimize. The resulting placement of smoke aperture(s) 62, 66 is asymmetric relative to the fuel nozzle hole 44'.

Introducing airflow 64 in this manner tends to leans out fine fuel droplets in the fuel/air mixture before entering a flame front (defined by swirl cone 51) in the primary combustion zone 46, which tends to increase the combustion temperature and reduce the CO level in the combustion gas. Furthermore, the airflow 64 from the smoke aperture 62 moves together with the fuel/air mixture in the swirl cone 51 and thus creates a local aerodynamic air barrier 53 around the swirl cone 51 of the fuel/air mixture to block a key "escape" path, and thereby reduce the amount of fuel escaping unburned from the primary combustion zone 46. UHC would otherwise tend to try to attach itself to the cold wall region in the area between each adjacent fuel nozzles, where it would cool to form carbon particulate and soot as moves towards the combustor exit. This airflow 64 therefore creates an aerodynamic blockage to the fuel/air mixture flow, which tends to increase residence time in the primary combustion zone 46, through additional recirculation of combustion air in that zone.

Figure 4:
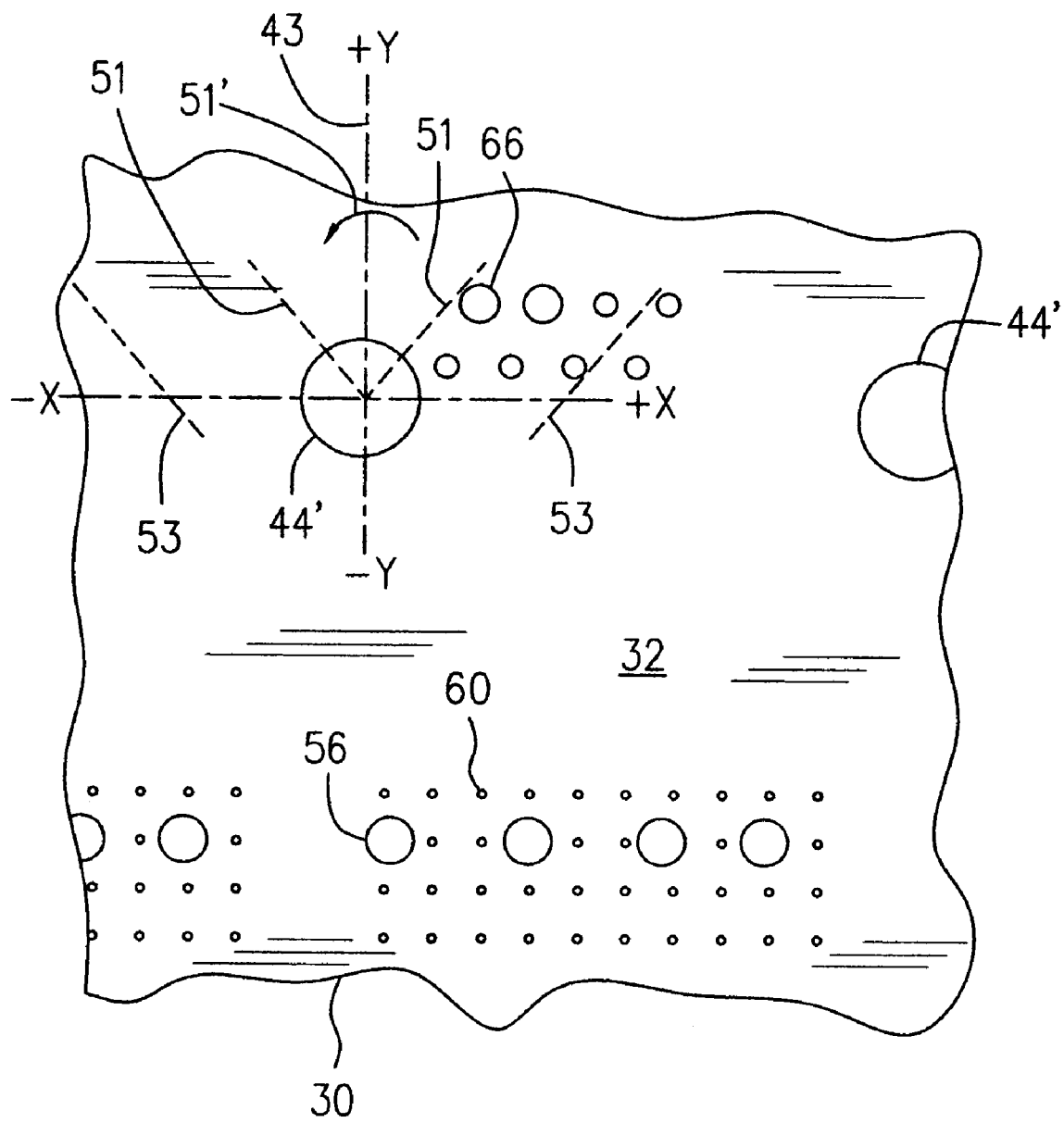
FIG. 4 is view similar to FIG. 3 of a combustor according to another embodiment of the present invention, showing a group of smoke apertures in an outer wall of the combustor liner.

In accordance with another embodiment of the present invention, a group of smoke apertures 66 in various sizes may be provided, as shown in FIG. 4. The group of the smoke apertures 66 function similarly to the single smoke aperture 62 in the embodiment of FIG. 3 and therefore need not be redundantly described here. It should be noted that although the size, number and distribution pattern of the smoke apertures 66 can vary in different applications, the size, number and distribution pattern of the smoke apertures 66 is preferably uniform for all nozzles in the combustor.

Figure 5:
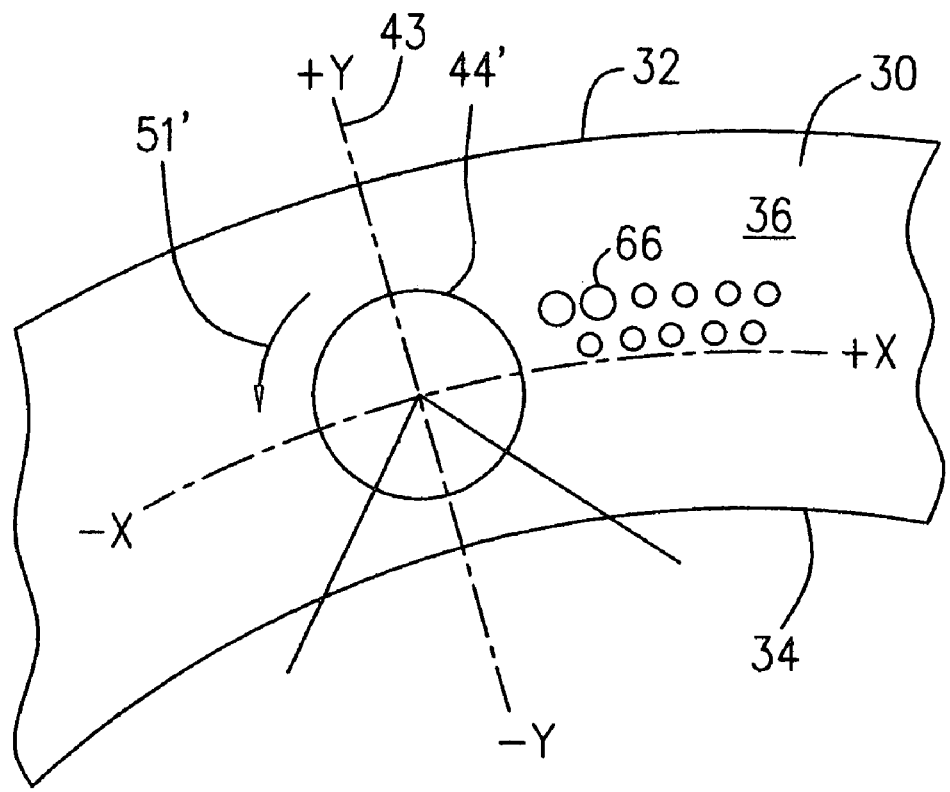
FIG. 5 is a partial front end view of a combustor according to a further embodiment of the present invention, showing a group of smoke apertures in an end wall of the combustor liner.
Figure 6:
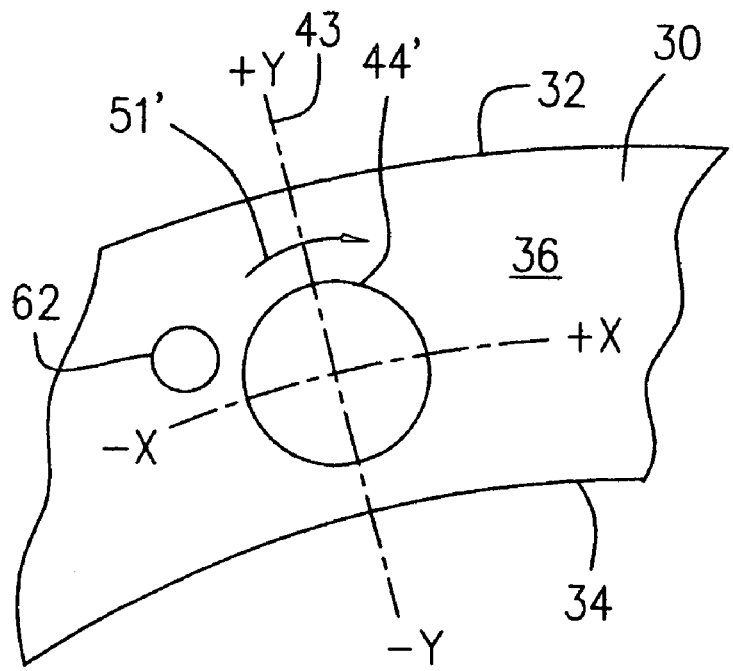
FIG. 6 is a partial front end view of a combustor according to a further embodiment of the present invention, showing a single smoke aperture in an end wall of the combustor liner.

Further embodiments of the present invention will now be described, with reference to FIGS. 5 and 6, which illustrate embodiments in which the fuel nozzles 44 (not shown) communicate with the combustor through holes 44' provided axially in the end wall 36 of a combustor, rather than radially as in FIG. 2-3 above. FIGS. 5-6, therefore, depicted end-on views of a portion of the end wall 36 of such a combustor. The arc arrows 51 indicate the swirl direction of the fuel/air mixture in a plane of the page.

The single smoke aperture 62 in FIG. 6 and group of smoke apertures 66 in FIG. 5, are defined in the end wall 36, located relative to the x-y axes of the fuel nozzle holes 44'. These particular locations of smoke apertures 62 or 66 are determined by the considerations discussed above. In FIG. 5, the location of smoke aperture 66 is similar to FIGS. 3 and 4, because swirl direction is also anti-clockwise. In the combustor of FIG. 6, however, where swirl direction is clockwise, smoke aperture 62 is located in quadrant −x+y, as a result of the reversed flow direction (relative to the combustors depicted in other Figures).

It will be understood that the airflow 64 introduced by smoke apertures 62 or 66 is always directed toward the swirl cone 51 of the fuel/air mixture in a tangential direction and in the swirl direction thereof (a direction perpendicular to and extending into the paper in the respective FIGS. 5-8), to enhance and thereby to move together with the fuel/air mixture in the swirl cone 51, thereby forming the air barrier 53 therearound. If the swirl direction of the fuel/air mixture from the fuel nozzle assemblies changes (i.e. in combustor design), the location of the smoke aperture must be changed accordingly. Therefore, as mentioned above, the smoke aperture(s) are located asymmetrically relative to fuel nozzle holes 44a.

The smoke hole 62 must have a momentum flux that is greater than the main combustor flow momentum flux in order to penetrate and be effective as described above. That is:

$$\rho_1 v_1^2 / \rho_2 v_2^2 > 1$$

where $\rho_1$ is the smoke aperture jet air density, $v_1$ is the smoke aperture jet air velocity, $\rho_2$ is the density of hot gas inside the combustor, and $v_2$ is the velocity of hot gas inside the combustor.

In general for the embodiment for FIGS. 2 and 3 described above, this will result in preferred size for the single smoke aperture 60 in the range between 30% to 35% of a fuel nozzle exit diameter, and more preferably equivalent to approximately 33% of the fuel nozzle exit diameter. For the group of smoke apertures 66, an equivalent diameter in the diameter range noted above is preferred, with the size of the individual smoke apertures 66 in each group preferably in a range of 10% and 20% of the fuel nozzle exit diameter. However, this is a preference alone, and is not a limiting factor. Size may also be dictated in part by the combustion system flame out margin, because the size and the number of the smoke apertures 62, 66 depend on the particular application and size of the combustor to determine the limit of the air-loading requirement. Excessive size and/or number of smoke apertures will deteriorate the combustion efficiency of the primary combustion zone and the lean flame out margin. This will affect the capability of the combustor to sustain the flame during load shade and/or operation at cold and high altitude environment. Also, size may also be dictated in part by the amount of smoke reduction desired, and other factors which will be apparent to the skilled reader in light of this disclosure.

The size and number of the smoke hole/holes depends on the application and size of the combustor to determine the limit of the air-loading requirement. Excessive size and/or number of smoke holes will surely deteriorate the efficiency of the primary zone and lean flame out margin. This will affect the capability of the combustor to sustain the flame during load shade and/or operation at cold and high altitude environment.

The airflow 64 introduced by the smoke apertures 62, 66 according to the present invention effectively lower the smoke and emissions in the combustion exhaust gases, particularly the visible smoke level. A similar combustor, but without the smoke aperture(s) 62, 66, will tend to have significantly higher visible smoke levels.

The above description is meant to be exemplary only, and one skilled in the art will recognize that changes may be made to the embodiments described without departure from the scope of the invention disclosed. For example, aperture 60, 62 need not be round, but may be slits or slots or any suitable shape. This invention may be used with any suitable type of combustor and fuel nozzle arrangement. Still other modifications which fall within the scope of the present invention will be apparent to those skilled in the art, in light of a review of this disclosure, and such modifications are intended to fall within the appended claims.

The invention claimed is:

1. A combustor for a gas turbine engine, the combustor comprising a combustor liner defining a combustor chamber, a plurality of nozzle holes permitting fuel nozzles each having an end exit in a direction at an angle greater than zero with respect to an axial direction of the fuel nozzle, to communicate with the combustor chamber therethrough for producing a fuel/air swirl cone in the combustor chamber, and at least one smoke aperture defined in an area of the combustor liner defining a primary combustion zone and adjacent to each nozzle hole, the smoke aperture and said adjacent nozzle hole having respective central axes substantially parallel one with another, the smoke aperture being positioned only in one of four quadrant areas around the adjacent nozzle hole and the central axis of the smoke aperture offset from a plane axially crossing the combustor chamber on which the central axis of the adjacent nozzle hole is defined in use admit an air flow therethrough to substantially tangentially impinge the fuel/air swirl cone in a same direction as a swirl direction of the fuel/air swirl cone, wherein the quadrant areas are defined by two orthogonal axes, one of the axes defined substantially parallel to a central axis of the gas turbine engine.

2. The combustor as defined in claim 1 wherein the at least one smoke aperture is located in a radially outer portion of the combustor.

3. The combustor as claimed in claim 1 wherein the combustor comprises at least one ignitor mounted to the combustor liner, the at least one smoke aperture being located generally axially between the at least one fuel nozzle assembly and the at least one ignitor.

4. The combustor as claimed in claim 1 wherein the at least one smoke aperture and said adjacent fuel nozzle hole are located in a circumferential cylindrical sidewall of the liner.

5. The combustor as claimed in claim 1 wherein the at least one smoke aperture and fuel nozzle hole are located in an endwall of the liner.

6. The combustor as claimed in claim 1 wherein the at least one smoke aperture comprises an array of smoke apertures.

7. The combustor as claimed in claim 1 wherein the at least one smoke aperture has an effective diameter in the range of 30% to 35% of a diameter of the fuel nozzle hole.

8. The combustor as claimed in claim 6 wherein the smoke apertures have a diameter in the range of 10% to 20% of a diameter of the fuel nozzle hole.

9. The combustor as claimed in claim 1 further comprising a plurality of effusion cooling holes defined in the combustor liner and distributed substantially regularly around the fuel nozzle hole.

10. A combustor for a gas turbine engine comprising a liner having annular outer and inner walls defining an annular chamber having a closed axial end and an open axial end, a plurality of circumferentially spaced fuel nozzle holes defined in the outer wall each to permit a fuel nozzle to extend radially therethrough for introducing a swirl cone of fuel/air mixture into the chamber generally towards the closed axial end for combustion, and at least one smoke aperture defined in the outer wall adjacent to each nozzle hole, the smoke aperture and said adjacent nozzle hole having substantially parallel central axes, the smoke aperture positioned axially between the adjacent nozzle hole and the closed axial end of the annular chamber and located in only one of four quadrant areas around the adjacent nozzle hole and the central axis of the smoke aperture offset from a plane axially crossing the combustor chamber on which the central axis of the adjacent nozzle hole is defined, in order to admit air therethrough to substantially tangentially impinge the swirl cone, wherein the quadrant areas are defined by two orthogonal axes, one of the axes defined substantially parallel to a central axis of the gas turbine engine.

11. The combustor as claimed in claim 10 wherein the combustor comprises at least one ignitor hole defined the combustor liner, the at least one smoke aperture being located generally axially between the at least one fuel nozzle hole and the at least one ignitor.

12. The combustor as claimed in claim 10 wherein the at least one smoke aperture comprises an array of smoke apertures.

13. The combustor as claimed in claim 10 wherein the at least one smoke aperture has an effective diameter in the range of 30% to 35% of a diameter of the fuel nozzle hole.

14. The combustor as claimed in claim 12 wherein the smoke apertures have a diameter in the range of 10% to 20% of a diameter of the fuel nozzle hole.

15. The combustor as claimed in claim 10 further comprising a plurality of effusion cooling holes defined in the combustor liner and distributed substantially regularly around the fuel nozzle hole.

\* \* \* \* \*